United States Patent

[11] 3,583,786

| | | |
|---|---|---|
| [72] | Inventor | Enrique A. J. Marcatili<br>Rumson, N.J. |
| [21] | Appl. No. | 860,268 |
| [22] | Filed | Sept. 23, 1969 |
| [45] | Patented | June 8, 1971 |
| [73] | Assignee | Bell Telephone Laboratories, Incorporated<br>Murray Hill, Berkeley Heights, N.J. |

[54] OPTICAL WAVEGUIDE FORMED OF CYLINDERS WITH OPTICALLY SMOOTH INTERFACES THEREBETWEEN
6 Claims, 4 Drawing Figs.

[52] U.S. Cl. .................................... 350/96WG
[51] Int. Cl. ...................................... G02b 5/14
[50] Field of Search .......................... 350/96, 96 WG

[56] References Cited
UNITED STATES PATENTS

| | | | |
|---|---|---|---|
| 3,386,043 | 5/1968 | Marcatili et al. | 350/96WGUX |
| 3,436,141 | 4/1969 | Comte | 350/96 |

*Primary Examiner*—John K. Corbin
*Attorneys*—R. J. Guenther and Arthur J. Torsiglieri ABSTRACT: Some practical problems encountered in the fabrication of hollow metallic waveguides for use at millimeter and optical frequencies are overcome in a structure comprising a hollow glass tube surrounded by pairs of dielectric layers of prescribed refractive indices and thicknesses. An outer metallic layer is optional. In addition to resolving fabrication problems, the attenuation constant is reduced as the number of pairs of dielectric layers is increased.

PATENTED JUN 8 1971    3,583,786

INVENTOR
E. A. J. MARCATILI
BY
ATTORNEY

OPTICAL WAVEGUIDE FORMED OF CYLINDERS WITH OPTICALLY SMOOTH INTERFACES THEREBETWEEN

This invention relates to dielectric waveguiding structures whose cross-sectional dimensions are large compared to the wavelength of the electromagnetic wave energy to be propagated therethrough.

BACKGROUND OF THE INVENTION

In U.S. Pat. No. 3,386,043, there is disclosed a dielectric waveguide comprising an inner, low-loss dielectric material, such as air, surrounded by an outer, dielectric material of substantially higher dielectric constant. In particular, it was noted that the outer dielectric material can be a metal since, at optical frequencies, for which the invention was of particular interest, metals exhibit large dielectric constants. As a practical matter, however, it has been found to be extremely difficult to produce a sufficiently smooth hollow metallic tube whose inside diameter is of the order of 10 wavelengths at the frequencies of interest. To avoid this difficulty, the inner surface of glass tubes, having the required internal cross-sectional dimension, have been coated with a metallic layer. The resulting surface, however, has been found to be spongy, resulting in high attenuation due to scattering at the air-metal interface.

SUMMARY OF THE INVENTION

In accordance with the present invention, the prior art waveguide has been modified by depositing a metallic layer on the outer surface of a hollow glass tube to form a three-layer dielectric waveguide comprising an inner dielectric material, surrounded by a second dielectric material of slightly higher dielectric constant, and an outer, usually metallic layer of substantially higher dielectric constant. By depositing the metallic layer on the outer surface of the glass tube, instead of its inner surface, a smoother metallic interface is obtained.

In a second embodiment of the invention a plurality of pairs of layers of dielectric materials of prescribed refractive indices and thicknesses are interposed between the glass and the outer metallic layer, resulting in a reduction in the attenuation constant of the waveguide. By making the number of pairs of layers large enough, the outer metallic layer can be omitted.

These and other objects and advantages of the present invention, and its various features will appear more fully upon consideration of the several illustrative embodiments now to be described in detail in connection with the accompanying drawings.

DETAILED DESCRIPTION

Figure 1:
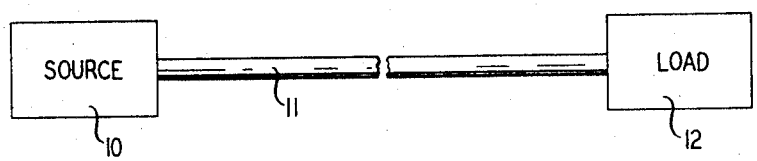
FIG. 1 shows a long distance transmission system utilizing the present invention.

Referring to FIG. 1, there is illustrated a typical long-distance, guided wave transmission system in which the present invention has utility. The system is characterized as long so as to define a system in which the factor of transmission attenuation is important. The length of such a system would be measured in hundreds of meters or miles.

The system comprises a source, 10, of millimeter or optical wave energy, which source can be a transmitter, or if this is an intermediate station, a repeater. Source 10 is connected by means of a dielectric transmission line 11 to a load 12, which can be either the terminal end of the system or another repeater.

The transmission line is further characterized as having cross-sectional dimensions that are large compared to the wavelength of the wave energy propagating therein. For millimeter waves, cross-sectional dimensions of the order of 10 or more wavelengths are typical. For optical waves, cross-sectional dimensions of the order of hundreds of wavelengths are typical.

Figure 2:
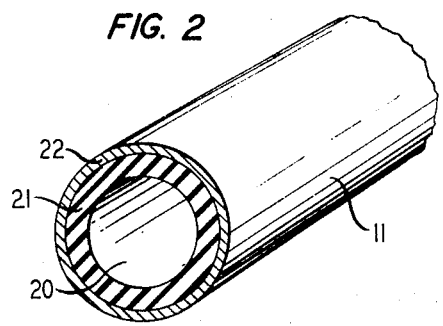
FIG. 2 shows a first embodiment of the invention comprising three dielectric materials.

FIG. 2 is a detailed drawing of line 11. The latter comprises a first, inner dielectric cylinder 20 of radius $r$ and refractive index $n_1$, surrounded by a second, hollow dielectric cylinder 21 of thickness $t$ and refractive index $n_2$, and a third, outer hollow dielectric cylinder 22 of refractive index $n_3$.

The inner cylinder 20, within which most of the wave energy is confined, is preferably composed of an inert gas, such as nitrogen, or this region can be evacuated in order to minimize losses. Cylinder 20 can, alternatively, be a low-loss solid or liquid dielectric material.

The second cylinder 21 is similarly a low-loss material whose refractive index $n_2$ and optimum thickness $t_{2opt}$ are related by $$t_{2opt} = \frac{m\lambda}{2\sqrt{\left(\frac{n_2}{n_1}\right)^2 - 1}} = m\frac{\lambda_g}{2} \qquad (1)$$

where
$\lambda$ is the free-space wavelength of the wave energy,
$\lambda_g$ is the radial wavelength of the guided mode in cylinder 21, and
$m$ is an integer.

The thickness is not critical, however, and may deviate from this optimum value by as much as $\pm 1/8\lambda_g$.

The outer cylinder, as described in the above-identified patent, is advantageously a high dielectric loss material for the reasons described therein.

A typical waveguide, in accordance with the present invention, would comprise a hollow glass tube upon whose outer surface a layer of metal has been deposited. In such a structure, the inner cylinder is air, the second dielectric material is the glass, and the third dielectric material is the metal. The practical advantage of such an arrangement resides in the fact that the metal is deposited upon a smooth glass surface, forming a correspondingly smooth interface which has negligible scattering losses.

Figure 3:
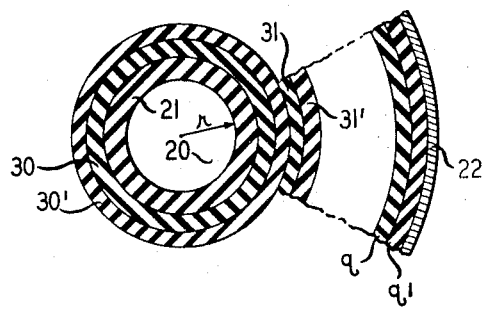
FIG. 3 shows a second embodiment of the invention in which a plurality of pairs of layers of dielectric materials are placed between the outer two layers of material of the embodiment of FIG. 2.

FIG. 3 shows a second embodiment of the invention wherein a plurality of additional pairs of layers of low-loss dielectric materials are interposed between the outer two dielectric cylinders of the waveguide shown in FIG. 2. Using the same identification numerals in FIG. 3 for the corresponding elements of the waveguide, the plurality of pairs of layers 30–30', 31–31'—and $q$–$q'$ are interposed between cylinder 21 and the outermost cylinder 22. In particular, it has been discovered that when the layer thicknesses $T_p$ and $T_{p'}$ are $$T_p = \frac{(2k+1)\lambda}{4\sqrt{\left(\frac{n_p}{n_1}\right)^2 - 1}} = (2k+1)\left(\frac{\lambda_g}{4}\right) \qquad (2)$$

and $$T_{p'} = \frac{(2j+1)\lambda}{4\sqrt{\left(\frac{n_{p'}}{n_1}\right)^2 - 1}} = (2j+1)\left(\frac{\lambda_{g'}}{4}\right) \qquad (3)$$

the attenuation $\alpha$ of the waveguide is given by $$\alpha = \prod_{p=1}^{q} \left(\frac{n_p^2 - n_1^2}{n_{p'}^2 - n_1^2}\right) \alpha_o \qquad (4)$$

where
$n_p$ and $n_{p'}$ are the refractive indices of the inner and outer layers, respectively, of the $p^{th}$ pair of dielectric layers;
$k$ and $j$ are integers;
$q$ is the number of pairs of dielectric layers;
$\lambda$ is the free space wavelength of the guided wave energy;
$\alpha_o$ is the attenuation constant of the waveguide without any pairs of layers of dielectric materials; and $\lambda_g$ and $\lambda_{g'}$ are the radial wavelengths of the guided mode in the respective layers of dielectric material.

In the particular case where all the pairs of layers are identical, equation (4) reduces to $$\alpha = \left(\frac{n_p^2 - n_1^2}{n_{p'}^2 - n_1^2}\right)^q \alpha_o \qquad (5)$$

As an example of the reduction in the attenuation that can be realized by this technique, consider a waveguide comprising 20 pairs of layers made of $MgF_2$ having a refractive index of 1.38 at $\lambda = 0.5 \mu$, and ZnS, having a refractive index of 2.35. Substituting these values in equation (5) gives $$\alpha = (0.196)^{20} \alpha_o$$

or $$\alpha = 0.0015 \alpha_o$$

Thus, the losses in a waveguide made in accordance with the second embodiment of the invention are roughly one-thousandth the losses of both a prior art waveguide and a waveguide made in accordance with FIG. 2.

It should also be noted that while the thicknesses $T_p$ and $T_{p'}$, given by equations (2) and (3) are optimum, they are not critical and can vary by as much as $\pm \lambda_g/8$ and $\pm \lambda_{g'}/8$, respectively. The full reduction in attenuation, given by equation (4) will not be realized, however, if the thicknesses are other than optimum.

Figure 4:
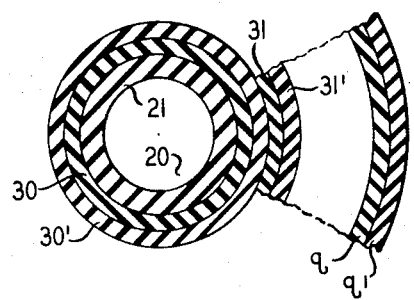
FIG. 4 shows an alternate arrangement of the embodiment of FIG. 3 in which the outermost dielectric layer is omitted.

FIG. 4 shows a modification of the embodiment of FIG. 3 wherein the number $q$ of pairs of dielectric layers is sufficiently large, of the order of 20 or more, to permit omitting the outer dielectric layer 22. An analysis of this configuration shows that the added attenuation which results when outer layer 22 is omitted is slight compared to the overall reduction in attenuation that is realized when the number of pairs of layers is sufficiently large.

I claim:

1. A transmission medium for guiding electromagnetic wave energy comprising a plurality of concentric cylinders including:

an innermost cylinder of low-loss material having a refractive index $n_1$;

a second cylinder of low-loss material having a refractive index $n_2$ greater than $n_1$ and a thickness $$t_2 = m\frac{\lambda_g}{2} \pm \frac{\lambda_g}{8}$$

surrounding said innermost cylinder;
   where $m$ is an integer $$\lambda_g = \lambda \bigg/ \sqrt{\left(\frac{n_2}{n_1}\right)^2 - 1};$$

and $\lambda$ is the free space wavelength of said wave energy;
   and an outermost cylinder of material having a refractive index that is larger than that of both of said other cylinders;
   said cylinders forming optically smooth interfaces therebetween.

2. The transmission medium according to claim 1 wherein said innermost material is a gas;
   said second cylinder is a hollow glass tube;
   and said outermost material is a metal.

3. The transmission medium according to claim 1 including:
   $q$ pairs of layers of low-loss material disposed between said second and said outermost cylinders;

characterized in that:
   each of said pairs of layers includes an inner layer of material having a refractive index $n_p$ and a thickness $t_p = (2k+1)\lambda_p/4 \pm \lambda_p/8$, and an outer layer of material having a refractive index $n_{p'}$ and a thickness $t_{p'} = (2j+1)\lambda_{p'}/4 \pm \lambda_{p'}/8$
   where $k$ and $j$ are integers;

$$\lambda_p = \frac{\lambda}{\sqrt{\left(\frac{n_p}{n_1}\right)^2 - 1}}; \quad \lambda_{p'} = \frac{\lambda}{\sqrt{\left(\frac{n_{p'}}{n_1}\right)^2 - 1}}$$

4. The transmission medium according to claim 3 wherein said $q$ pairs of layers are different.

5. The transmission medium according to claim 3 wherein said $q$ pairs of layers are the same.

6. A transmission medium for guiding electromagnetic wave energy comprising:

an innermost cylinder of low-loss material having a refractive index $n_1$;

a second cylinder of low-loss material having a refractive index $n_2$ greater than $n_1$ and a thickness $$t_2 = m\frac{\lambda_g}{2} \pm \frac{\lambda_g}{8}$$

surrounding said innermost cylinder;
   where $m$ is an integer;

$$\lambda_g = \frac{\lambda}{\sqrt{\left(\frac{n_2}{n_1}\right)^2 - 1}}$$

and $\lambda$ is the free space wavelength of said wave energy;
   and a plurality of $q$ pairs of layers of low-loss material surrounding said second cylinder;
   characterized in that:
   each of said pairs of layers includes an inner layer of material having refractive index $n_p$ and a thickness $$T_p = (2k+1)\frac{\lambda_p}{4} \pm \frac{\lambda_p}{8}$$

and an outer layer of material having a refractive index $n_{p'}$ and a thickness $$T_{p'} = (2j+1)\frac{\lambda_{p'}}{4} \pm \frac{\lambda_{p'}}{8}$$

where $k$ and $j$ are integers $$\lambda_p = \frac{\lambda}{\sqrt{\left(\frac{n_p}{n_1}\right)^2 - 1}}$$

and $$\lambda_{p'} = \frac{\lambda}{\sqrt{\left(\frac{n_{p'}}{n_1}\right)^2 - 1}}$$